United States Patent
Purkop et al.

(10) Patent No.: US 9,906,566 B2
(45) Date of Patent: Feb. 27, 2018

(54) VOICE SESSION TERMINATION FOR MESSAGING CLIENTS IN IMS

(71) Applicant: Vodafone GmbH, Dusseldorf (DE)

(72) Inventors: Thomas Purkop, Dusseldorf (DE); Giorgio Chiado Plat, Turin (IT)

(73) Assignee: VODAFONE GMBH, Dusseldorf (DE)

( * ) Notice: Subject to any disclaimer, the term of this patent is extended or adjusted under 35 U.S.C. 154(b) by 202 days.

(21) Appl. No.: 15/012,633

(22) Filed: Feb. 1, 2016

(65) Prior Publication Data
US 2016/0226923 A1 Aug. 4, 2016

(30) Foreign Application Priority Data
Feb. 4, 2015 (EP) .................... 15153833

(51) Int. Cl.
*H04L 29/06* (2006.01)
*H04M 7/00* (2006.01)
*H04W 76/02* (2009.01)

(52) U.S. Cl.
CPC ........ *H04L 65/1016* (2013.01); *H04L 65/103* (2013.01); *H04L 65/104* (2013.01); *H04L 65/1063* (2013.01); *H04L 65/1069* (2013.01); *H04M 7/006* (2013.01); *H04W 76/026* (2013.01)

(58) Field of Classification Search
None
See application file for complete search history.

(56) References Cited

FOREIGN PATENT DOCUMENTS

| WO | 2007/130323 A1 | 11/2007 |
|---|---|---|
| WO | 2012/110110 A1 | 8/2012 |
| WO | 2013/087114 A1 | 6/2013 |

OTHER PUBLICATIONS

European Search Report for EP 15 15 3833 dated Jul. 30, 2015.

*Primary Examiner* — Kwang B Yao
*Assistant Examiner* — Adam Duda
(74) *Attorney, Agent, or Firm* — Workman Nydegger (57) ABSTRACT

An IMS structure is described that hosts an IMS service based on a Rich Communication Suite (RCS) protocol for messaging only and IMS service based on VoLTE or Voice over WiFi. The IMS comprises functionality for rerouting a VoLTE or VoWiFi session invitation to a subscriber via a circuit switched network based on determined capabilities and authorizations of the invited subscriber.

14 Claims, 5 Drawing Sheets

VOICE SESSION TERMINATION FOR MESSAGING CLIENTS IN IMS

CROSS-REFERENCE TO RELATED APPLICATIONS

This application claims the benefit of and priority from European Patent Application No. 15153833.7, filed Feb. 4, 2015, the entire disclosure of which is expressly incorporated by reference herein in its entirety.

BACKGROUND

1. The Field of the Invention

The invention relates to an Internet Protocol (IP) Multimedia Subsystem (IMS) structure hosting at least two different IMS services, wherein at least one of the at least two different IMS services is based on Rich Communications Suite (RCS) for messaging only (RCS-messaging-only) and wherein at least another one of the at least two different IMS services is based on Voice over Long Term Evolution (VoLTE) or Voice over Wireless Fidelity (VoWiFi), respectively VoIP in general.

2. The Relevant Technology

Today mobile phones use the Global System for Mobile Communications (GSM) standard, which belongs to the second-generation of mobile telecommunications technology (2G), as well as the Universal Mobile Telecommunications System (UMTS) standard belonging to the third-generation of mobile telecommunications technology (3G). Further, belonging to the fourth-generation of mobile telecommunications technology (4G), the Long Term Evolution (LTE) standard is an evolution based on GSM and UMTS network technologies and used in the latest generation of mobile phones, smart phones and other user equipment (UE). GSM defines a circuit-switched (CS) network optimized for full duplex voice telephony and data communication (Voice and Circuit Switched Data), wherein so-called Mobile Switching Centers (MSC) switch the connections between the mobile phones and act as interface between the radio network and the fixed line network. In GPRS, i.e. General Packet Radio Service (GPRS) sometimes referred to as 2.5G, data communications are provided by packet data transport. In contrast, UMTS defines a radio access technology using the same core network as GSM/GPRS, but wherein with Release 4 (R4) separate CS control and media layer were introduced with MSC Servers and Media Gateways (MGW). Voice between the MGWs can be transported based on IP. Increased capacity and speed are available in LTE access networks using advanced digital signal processing (DSP) methods wherein the network architecture is fully based on an IP system. The CS core network as such does not exist and voice calls can be handled either by falling back to GSM/UMTS or can be handled by a protocol based on IP, e.g. VoLTE. VoLTE and VoWiFi are fully based on IMS.

For LTE and other IP-based networks the IMS designed by the 3$^{rd}$ Generation Partnership Project (3GPP) provides an architectural frame-work for multimedia services based on packet communication like voice, messaging, etc. (e.g. VoLTE, VoWiFi, VoIP in general, RCS, etc.). Although being originally developed for mobile applications IMS is used in wireless and fixed-line technologies, too. A user, or so-called subscriber, may connect to IMS by registering an IMS terminal directly on an IMS server, wherein the IMS terminal can be a mobile phone including a so-called smart phone, a Personal Digital Assistant (PDA), a computer or any other user equipment (UE). The protocol used in IMS for session handling such as session establishment, modification and termination is the standardized Session Initiation Protocol (SIP).

In IMS different Call Session Control Functions (CSCF) play central roles as they are used to process the SIP signaling packets and manage the IMS sessions. The Proxy CSCF (P-CSCF) is the first contact point for IMS service requests from the SIP clients. It is a SIP proxy and forwards requests from subscribers (SIP user agents) to other CSCFs and vice versa, as described hereafter. Further, the P-CSCF authenticates the subscriber by checking the available authorizations of the subscriber, negotiates the quality of service and may generate data for accounting besides the S-CSCF. The Interrogating CSCF (I-CSCF) requests from the HSS which S-CSCF (see further below) is responsible for managing the desired IMS session for the respective subscriber. The Serving CSCF, S-CSCF, is the main SIP session control node within the overall IMS network. It retrieves user profiles (e.g. the initial Filter Criteria, iFC) from the Home Subscriber Server (HSS) during the registration process, keeps the registration status, forwards the sessions to the different SIP Application Servers (AS) via the iFC and handles the SIP sessions in general. Different services are hosted and executed by different SIP Application Servers (AS) such as Telephony Application Server (TAS) (e.g. VoLTE SIP AS), IM SIP AS and the like. These application servers interface with the S-CSCF. Authentication and authorization of a user is managed by the HSS (as part of the registration process), which is a master user database and contains subscriber profiles. The HSS can provide information about a subscriber's location (S-CSCF), iFC and the like. Different users are discriminated by different identities, typically the Public User Identities (IMPU) and the Private User Identities (IMPI). The IMPU is the identity, which is used by other users to set up a session. In mobile networks this is usually the Mobile Subscriber Integrated Services Digital Network Number (MSISDN). Inter alia there are TEL Uniform Resource Identifiers (TEL URI) each representing a telephone number of one subscriber. Another IMPU, which is used in IMS for internal routing, is the SIP URI representing the corresponding SIP address or addresses of one subscriber, because the IMS uses domain based addressing. The mapping from the TEL URI to the SIP URI is done in the E.164 Number Mapping (ENUM) server. Different networks and subscribers are coupled via Session Border Controllers (SBC). Those SBCs implement sessions for unsecure external data networks in secure internal structures like IMS infrastructures.

Different IMS services can be hosted on the same IMS infrastructures. But for example an IM service can be hosted on one IMS infrastructure, whereas a VoLTE service can be hosted on another IMS infrastructure, too. Due to many different reasons such as centralization etc. and the resulting advantages like reduced maintenance costs for network providers, integration of several IMS services from different infrastructures on one IMS infrastructure is desirable. The present invention relates to a concrete realization of such integration. Hereby, one IMS infrastructure, which may comprise several distributed server machines, hosts different SIP ASs for corresponding IMS services. All these SIP AS's interface with the S-CSCF, which organizes different sessions of different IMS services of corresponding SIP AS's and communicates with the HSS for authorization of users and managing their access to said IMS services.

Certain IMS services may use the Rich Communication Suite (RCS) based on SIP for communication over IMS as RCS offers standardized services for 1-to-1/Group Chat, standalone messaging, file transfer, content sharing, and the like. An IMS infrastructure hosting inter alia an IM service based on RCS, referred to as RCS-message-only in the following, and a VoLTE and/or VoWiFi service may be unable to handle different types of session invitations without failure, as described in the following.

Nowadays, some IMS terminals have certain IMS capabilities like IM but lack other IMS capabilities like VoLTE and/or VoWiFi. For example a mobile User Equipment (UE) may have IM functionality but no VoLTE/VoWiFi functionality (called RCS-messaging-only in the further description). Instead said UE would use 2G/3G CS for telephony. Or a subscriber may have VoLTE/VoWiFi functionality but no access to a LTE or WiFi network.

Lacking functionality for and/or lacking access to a certain IMS service of an UE is referred to as lacking IMS service capability of a subscriber hereafter. Further, a subscriber may have a certain IMS service capability but no allowance to use this IMS service. This is referred to as lacking IMS service authorization of a subscriber subsequently.

In one exemplary scenario a subscriber named B with UE B has IM capability and an associated authorization but no VoLTE and/or VoWiFi capability and/or an associated authorization and uses 2G/3G CS for telephony (RCS-message-only subscriber). Another subscriber A with UE A has both IM and VoLTE capability and authorization. In an integrated IMS infrastructure, as described above, one has to be aware of certain assignment issues. If subscriber B (RCS-message-only) is registered in the S-CSCF of an integrated IMS infrastructure and subscriber A is also registered with the same IMS infrastructure, then subscriber A may try to invite subscriber B to a voice session, e.g. VoLTE/VoWiFi. The S-CSCF of the IMS would try to terminate this voice session towards UE B, by passing a related invitation message to UE B, because it is unaware of the capabilities of UE B (or more precisely because it cannot do SIP session termination or rerouting to CS network based on the UE's capabilities). As subscriber B is not capable of/authenticated for VoLTE/VoWiFi the termination would fail. Hence, there is a source for erroneous invitation requests in common integrated IMS infrastructures. Thereby, it does not matter, if subscriber B is connected to a different IMS infrastructure than subscriber A. In case subscriber A and subscriber B are registered within one IMS infrastructure, the connection is established within said one infrastructure. In case subscriber B is registered in another IMS infrastructure, an I-CSCF may establish a connection to an S-CSCF of a remote IMS infrastructure. Hence, in any case connections to subscribers in the same or in different networks can be established.

Hence, it is an objective of the present invention to solve or alleviate the technical problems and disadvantages set forth above. Hereunto, the present invention describes an integrated IMS infrastructure for different IMS services, respectively IM service and VoLTE/VoWiFi service, wherein user assignment and session termination is unambiguous and fail-safe.

BRIEF SUMMARY

Said objective is achieved by means of an IMS infrastructure according to the features of claim 1 and a method for rerouting in an IMS infrastructure according to claim 8. Further advantageous refined embodiments are subject of dependent claims. The features specified individually in the claims may be combined with one another in any desired and technologically meaningful way and may be supplemented by explanatory facts from the description, with further design variants of the invention being specified.

The invention relates to an Internet Protocol (IP) Multimedia Subsystem (IMS) infrastructure that hosts at least two different IMS services. Hereby, at least one of the at least two different IMS services is based on Rich Communications Suite (RCS) for messaging only (RCS-messaging-only). Additionally, at least another one of the at least two different IMS services is based on Voice over Long Term Evolution (VoLTE) or Voice over Wireless Fidelity (VoWiFi) (VoLTE/VoWiFi). The IMS infrastructure comprises a server or corresponding service function for determining at least RCS-messaging-only service session capabilities and authorizations and VoLTE or VoWiFi service session capabilities and authorizations of a subscriber, wherein the determination as well as the services are based on SIP. Further, the IMS infrastructure comprises a server or corresponding service function for rerouting a VoLTE or VoWiFi session invitation for said subscriber to a Breakout Gateway (BG) using a Breakout Gateway Control Function (BGCF) for forwarding said VoLTE or VoWiFi session invitation to said subscriber via a Media Gateway Control Function (MGCF) and a Circuit Switched (CS) connection based on the determined capabilities and authorizations of said subscriber.

The integrated IMS infrastructure is capable of determining which subscriber has which capabilities and authorizations for RCS-messaging-only service and VoLTE or VoWiFi service sessions. This feature enables the IMS to detect an IMS session invitation that cannot be terminated at the desired destination subscriber. Based on this knowledge the IMS session termination can be rerouted by said server or corresponding service function to a CS network using a BGCF, wherein it is assumed that the desired destination subscriber is capable and/or authorized for the CS connection service. However, if the desired subscriber is not qualified for termination of the session due to any reason, a distinct error message can be thrown. For Example, a VoLTE session invitation of a subscriber with VoLTE capability and authorization for a subscriber that has no VoLTE capability or authorization, but RCS-message-only capability and authorization (RCS-message-only subscriber), can be rerouted via an CS network to the desired destination instead of causing a failed termination attempt trying to invite the RCS-message-only subscriber to a VoLTE session. Only in case the desired receiving subscriber does not have the capability or authorization for receiving/terminating a CS connection service, a distinct error message is raised and the invitation fails.

Thus, failing VoLTE/VoWiFi session invitations, due to insufficient capabilities or authorizations of the desired terminating subscriber, can be avoided. Instead said invitations can be efficiently and successfully rerouted via a CS network.

An advantageous refined embodiment of the present invention relates to an IMS infrastructure as described above comprising a Telephony Application Server (TAS) for determining at least RCS-messaging-only service and VoLTE or VoWiFi service session capabilities and authorizations of a subscriber via at least one initial Filter Criterion, iFC. Hereby, the TAS adds a prefix to a Mobile Subscriber Integrated Services Digital Network Number (MSISDN) of the subscriber. Further, the IMS infrastructure comprises a server using a Service-Call Session Control Function (S-CSCF). Said S-CSCF triggers the rerouting of a VoLTE or VoWiFi session invitation for said subscriber based on the MSISDN with prefix.

The TAS is a known server in the common IMS standard. Through implementation of additional functionality the TAS can determine the respective IMS service capabilities/authorizations of a terminating subscriber. According to the determined capabilities/authorizations the enhanced TAS is further able to add a distinct prefix to the MSISDN of said subscriber. Based on this MSISDN with prefix the S-CSCF can trigger the rerouting of a VoLTE/VoWiFi session invitation for said subscriber.

The enhancement of the TAS with additional functionality is implementation-wise a very efficient way to meet the present requirements for successful session invitation termination.

In a further advantageous refined embodiment of the present invention an IMS infrastructure comprises a separate Application Server (AS) for receiving a VoLTE and/or VoWiFi session invitation for a subscriber. Said receiving is based on at least RCS-messaging-only service session capabilities and authorizations and VoLTE or VoWiFi service session capabilities and authorizations of said subscriber. These capabilities and authorizations are determined via at least one iFC. The separate AS further adds a prefix to a MSISDN of the subscriber. The IMS Infrastructure also comprises a server using a S-CSCF triggering the rerouting of said VoLTE or VoWiFi session invitation for said subscriber via the MSISDN with prefix.

The via iFC determined capabilities/authorizations of a subscriber are used to decide whether a VoLTE/VoWiFi session invitation is to be received via the separate AS that is especially designed for invitations that would normally fail to terminate at the desired RCS-message-only subscriber. Therefore, the separate AS adds a prefix to the MSISDN of RCS-message-only subscribers based on the determined capabilities/authorizations. A VoLTE/VoWiFi session invitation for a RCS-message-only subscriber can thusly be rerouted via a BGCF. This breakout is triggered by the S-CSCF based on the MSISDN with prefix.

Implementation of a separate AS exclusively for VoLTE/VoWiFi session invitations for RCS-message-only subscribers splits off the functionality needed for safe rerouting of those invitations from the commonly used AS for VoLTE/VoWiFi. This simplifies the integration of the desired extra functionality into existing IMS infrastructures.

Still a further advantageous refined embodiment of the present invention relates to an IMS infrastructure comprising a server using a S-CSCF that uses at least one iFC to trigger usage of a MGCF as an AS for a VoLTE or VoWiFi session invitation for a subscriber. This triggering is based on at least RCS-messaging-only service session capabilities and authorizations and VoLTE or VoWiFi service session capabilities and authorizations of said subscriber. The MGCF forwards said VoLTE or VoWiFi session invitation to said subscriber via a CS network.

Through integration of additional initial Filter Criteria (iFC) functionality the S-CSCF is able to determine the VoLTE/VoWiFi capabilities/authorizations of a subscriber. For RCS-messaging-only users there is a terminating iFC (normally not set) which forwards VoLTE/VoWiFi sessions directly to MGCF. A VoLTE/VoWiFi session invitation to a RCS-message-only subscriber can therefore be rerouted via a MGCF to a CS network by the S-CSCF based on the determined capabilities/authorizations of said user. Hence, such VoLTE/VoWiFi session invitations, which would normally fail due to lack of capabilities or authorizations on the terminating end, are successfully rerouted via MGCF to a CS network.

The addition of the additional iFC and direct forwarding of the voice session to CS is a very efficient implementation of the desired fail-safe rerouting functionality for VoLTE/VoWiFi session invitations for RCS-message-only subscribers.

In yet another further advantageous refined embodiment of the present invention an IMS infrastructure comprises a server using a S-CSCF using a functionality based on Caller Preferences Functionality, CPF, according to RFC 3841. The S-CSCF excludes a subscriber from a list of possible destinations for a VoLTE and/or VoWiFi session based on at least RCS-messaging-only service session capabilities and authorizations and VoLTE or VoWiFi service session capabilities and authorizations of said subscriber. In the S-CSCF a VoLTE or VoWiFi session invitation for said subscriber triggers forwarding of said session to a BGCF. This triggering is based on the determined capabilities and authorizations of said subscriber. The BGCF forwards said VoLTE or VoWiFi session invitation to said subscriber via a CS network.

With those enhancements of CPF it is possible to remove a RCS-message-only subscriber from the list of potential VoLTE/VoWiFi terminating destinations. If the S-CSCF cannot find the desired terminating subscriber in said list of destinations the invitation may be sent for example to BGCF. This rerouting to BGCF is due to the determined insufficient IMS capabilities/authorizations of said subscriber. The VoLTE/VoWiFi session invitation is hence terminated at the desired subscriber via a CS network.

The CPF is well defined in RCS 3841 and therefore the implementation can be realized in an efficient way.

Still another advantageous refined embodiment of the present invention relates to an IMS infrastructure comprising an E.164 Number Mapping (ENUM) server that stores Session Initiation Protocol (SIP) Uniform Resource Identifiers (URI). Said SIP URIs enable determining at least RCS-messaging-only service session capabilities and authorizations and VoLTE or VoWiFi service session capabilities and authorizations of a subscriber. Hereby, the ENUM server is provisioned with a SIP URI with a distinct domain for a subscriber based on the determined capabilities and authorizations of said subscriber. Additionally, the IMS infrastructure comprises a server using a S-CSCF that checks a service type of a VoLTE or VoWiFi session invitation and the SIP URI and triggers rerouting of said VoLTE or VoWiFi session invitation to a CS network based on the provided SIP URI.

The ENUM server is responsible for mapping to a MSISDN a specific SIP URI as used in IMS sessions. In order to discern a RCS-message-only subscriber from a VoLTE/VoWiFi subscriber the ENUM server is provisioned with distinct SIP URI domains. By means of these SIP URI domains the S-CSCF can reroute a VoLTE/VoWiFi session invitation for a RCS-message-only subscriber.

As the ENUM server is a standardized element in the IMS framework, the implementation of the determination functionality can efficiently be realized by adapting said ENUM server.

Yet in a further advantageous refined embodiment of the present invention an IMS infrastructure comprises an ENUM server storing SIP URIs. These SIP URIs enable determining at least RCS-messaging-only service session capabilities and authorizations and VoLTE or VoWiFi service session capabilities and authorizations of a subscriber.

Here, the ENUM server assigns one SIP URI with a distinct SIP URI domain to a subscriber for each IMS service based on the determined capabilities and authorizations of said subscriber. Further, the IMS infrastructure comprises a server that uses a S-CSCF that checks a service type of a VoLTE or VoWiFi session invitation, selects the corresponding SIP URI for said VoLTE or VoWiFi session invitation and triggers rerouting of said VoLTE or VoWiFi session invitation to a CS-base network based on the assigned SIP URI domain.

Different SIP URIs with corresponding distinct domains for each IMS service capability and authorization of a subscriber enable distinguishing between RCS-message-only and VoLTE/VoWiFi subscribers. Therefore, if a VoLTE/VoWiFi session invitation for a RCS-message-only subscriber arrives at the S-CSCF the latter can select the correct SIP URI with proper domain for said subscriber. Based on that SIP URI domain said VoLTE/VoWiFi session invitation can be rerouted to the desired RCS-message-only subscriber over a CS network.

As the ENUM server is a standardized element in the IMS framework, the implementation of the determination functionality can be efficiently realized by adapting said ENUM server. Further, providing different SIP URI domains for different IMS services and therefore assigning several SIP URIs with distinct assigned domains to a subscriber, enables more detailed differentiation of capabilities/authorizations for each subscriber. This is useful if many different IMS services are hosted by the IMS infrastructure.

The advantages of the above described embodiments of the present invention related to IMS infrastructures are the same as the advantages of the corresponding methods for rerouting in IMS infrastructures according to the present invention.

The present invention relates to a method for rerouting a VoLTE or VoWiFi session invitation in an Internet Protocol (IP) Multimedia Subsystem (IMS) infrastructure hosting at least two different IMS services. At least one of the at least two different IMS services is based on Rich Communications Suite (RCS) for messaging only (RCS-messaging-only) and at least another one of the at least two different IMS services is based on Voice over Long Term Evolution (VoLTE) or Voice over Wireless Fidelity (VoWiFi). Said method for rerouting comprises the steps of: Determining at least a RCS-messaging-only service and VoLTE or VoWiFi service session capabilities and authorizations of a subscriber by a server comprised in the IMS infrastructure; Rerouting a VoLTE or VoWiFi session invitation for the subscriber by a server comprised in the IMS infrastructure for rerouting a VoLTE or VoWiFi session invitation for the subscriber to a Breakout Gateway (BG) comprised in the IMS infrastructure using a Breakout Gateway Control Function (BGCF) for forwarding said VoLTE or VoWiFi session invitation to said subscriber via a Media Gateway Control Function (MGCF) and a Circuit Switched network (CS) network based on the determined capabilities and authorizations of said subscriber.

A further refined embodiment of the present invention relates to a method for rerouting a VoLTE or VoWiFi session invitation further comprising the steps of: Determining at least RCS-messaging-only service session capabilities and authorizations and VoLTE or VoWiFi service session capabilities and authorizations of a subscriber via at least one initial Filter Criterion, iFC, in a Telephony Application Server, TAS comprised in the IMS infrastructure and adding a prefix to a Mobile Subscriber Integrated Services Digital Network Number, MSISDN, of the subscriber; Triggering the rerouting of a VoLTE or VoWiFi session invitation for said subscriber in a server using a Service-call Session Control Function (S-CSCF) comprised in the IMS infrastructure based on the MSISDN with prefix.

A further refined embodiment of the present invention relates to a method for rerouting a VoLTE or VoWiFi session invitation further comprising the steps of: Receiving a VoLTE and/or VoWiFi session invitation for a subscriber in a separate application Server, AS comprised in the IMS infrastructure based on the service session capabilities and authorizations of said subscriber determined via at least one iFC, and adding a prefix to a MSISDN of the subscriber by said separate AS; Triggering the rerouting of said VoLTE or VoWiFi session invitation for said subscriber in a server using a Service-Call Session Control Function, S-CSCF comprised in the IMS infrastructure based on the MSISDN with prefix.

A further refined embodiment of the present invention relates to a method for rerouting a VoLTE or VoWiFi session invitation further comprising the steps of: Using at least one iFC by a server using a S-CSCF comprised in the IMS infrastructure to trigger usage of a MGCF as AS for a VoLTE or VoWiFi session invitation for a subscriber based on the determined service session capabilities and authorizations of said subscriber, and forwarding said VoLTE or VoWiFi session invitation by the MGCF to said subscriber via a CS network.

A further refined embodiment of the present invention relates to a method for rerouting a VoLTE or VoWiFi session invitation further comprising the steps of: Using a Caller Preferences Functionality, CPF, according to RFC 3841 in a server using a S-CSCF comprised in the IMS infrastructure to exclude a subscriber from a list of possible destinations for VoLTE or VoWiFi session invitations based on the determined service session capabilities and authorizations of said subscriber, wherein a VoLTE or VoWiFi session invitation for said subscriber triggers forwarding of said session to a BGCF based on the determined service session capabilities and authorizations of said subscriber; Forwarding said VoLTE or VoWiFi session invitation to said subscriber by a BGCF via a CS network.

A further refined embodiment of the present invention relates to a method for rerouting a VoLTE or VoWiFi session invitation further comprising the steps of: Determining the service session capabilities and authorizations of a subscriber by an SIP URI enabled ENUM server comprised in the IMS infrastructure, wherein a SIP URI with a distinct domain is provided for said subscriber based on the determined capabilities and authorizations of said subscriber; Checking the SIP URI and triggering rerouting of a VoLTE or VoWiFi session invitation to a CS network by a server using a S-CSCF comprised in the IMS infrastructure based on the provided SIP URI domain.

A further refined embodiment of the present invention relates to a method for rerouting a VoLTE or VoWiFi session invitation further comprising the steps of: Determining the service session capabilities and authorizations of a subscriber in an ENUM server comprised in the IMS infrastructure based on SIP URIs, wherein one SIP URI with a distinct SIP URI domain for each IMS service is assigned to said subscriber based on the determined service session capabilities and authorizations of said subscriber; Checking the service, selecting the corresponding SIP URI for a VoLTE or VoWiFi session invitation and triggering the rerouting of the VoLTE or VoWiFi session invitation to a CS network by a server using S-CSCF comprised in the IMS infrastructure based on the assigned SIP URI domain.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings, wherein the figures show.

DETAILED DESCRIPTION

The term "server" as used in this description is a system that may host one or more server functionalities or functions implemented in any appropriate programming language. Hereby, a server may be hosted by one or multiple physical server machines that may be clustered or distributed. However, one server machine may also host several servers. Further, one server functionality or function may be hosted by several servers. The actual layout of the different servers and of the corresponding server functionalities or functions shall not limit the present invention. A person skilled in the art may choose an appropriate server layout according to the necessary and/or available environment without having to alter or change the basic elements of the present invention Accordingly, an infrastructure can be a multitude of clustered or distributed server machines or only one single server machine in the context of this description.

Further, the terms "IMS service session capabilities", "IMS service capability" and "IMS capability" are synonymously used for the "IMS service session functionality of a UE" and the "IMS service session access" based on the particular circumstance of a subscriber like bad connection quality/no access to LTE network but only to 2G/3G network and the like.

The terms "IMS service session authorization", "IMS service authorization" and "IMS authorization" are used synonymously in this description, too.

In this context "IMS service session", "IMS service" and "IMS", respectively, are representative placeholders for any possible IMS service like VoLTE, IM and the like.

The terms "IMS session" and "SIP session" are used synonymously, too.

For the description of procedures and communication structures in the field of telecommunications the terms for physical structures and functionalities or functions are often used synonymously or used in a mixed way. This shows that the actual realization of certain functionalities or functions is not relevant but only said functionalities or functions matter. As an example in the field of telecommunications it is often stated and illustrated in figures, that a certain CSCF (a functionality) is connected to the HSS (a server). This exemplifies, that only the functionality of the respective CSCF and the functionality of the HSS are of interest. Due to this matter the synonymous use of structure and functionality or function is also adopted in the present description.

Figure 1A:
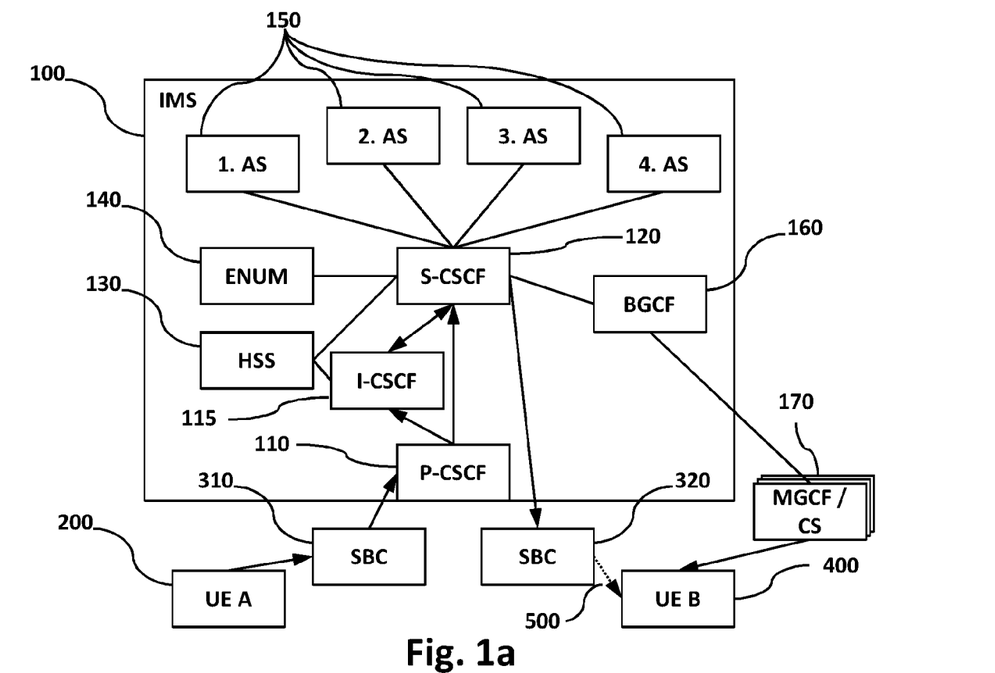
FIG. 1a: Schematic overview of a common IMS.

FIG. 1a depicts a common IMS infrastructure 100 and two users or subscribers 200/400. An incoming session request from subscriber 200 over SBC 310 is first handled by a P-CSCF 110, wherein we assume that the user is already registered to the IMS. The P-CSCF 110 first checks the authorization of the subscriber with UE A 200 sending the request, before it forwards the request to a corresponding S-CSCF 120. The S-CSCF can trigger an AS 150 for originating services. After the execution of the originating services the request is sent back to the S-CSCF 120 which needs to determine where to forward the re-quest and contacts an ENUM server 140 with a TEL URI (MSISDN). Any subscriber 200/400 can be identified by the unique MSISDN. The ENUM server 140 provides one or different SIP URIs associated to the MSISDN of a user depending on the requested IMS session type. An exemplary SIP URI as used for VoLTE/VoWiFi may look like given below:
+<MSISDN>@ims.mnc007.mcc262.3gppnetwork.org; user=phone With such SIP URI the correct destination IMS of the desired terminating subscriber 400 can be found and the S-CSCF 120 forwards the re-quest to the I-CSCF 115 of the destinations IMS. The I-CSCF 115 contacts the HSS 130 to get the location of the S-CSCF 120 that serves the UE B 400 in the terminating leg. The selected S-CSCF 120 handles as central controlling unit the requested session, wherein in this particular example the S-CSCF 120 serves subscriber 200 and subscriber 400 as they are both registered in the same IMS 100. The S-CSCF 120 may be connected with one or more ASs 150. Each ASs 150 can host one or more different IMS service sessions. After the execution of the terminating services the request is sent back to the S-CSCF 120 which forwards the request to UE B 400. Normally, this would happen via a SBC 320. If however the dialed MSISDN is not served (not provisioned) by the IMS the ENUM server 140 would not provide a SIP URI for it (NXDOMAIN). This would then trigger a rerouting. For this purpose IMS infrastructure 100 further comprises a BG with BGCF 160. The BGCF 160 is responsible for rerouting a request to a different infrastructure like a CS network 170 via a 2G/3G CS infrastructure. Therefore, the BGCF 160 selects an appropriate MGCF 170 for the respective rerouting. The rerouting to a CS network 170 is called CS breakout.

In such common IMS infrastructure 100 the subscriber 200 may invite subscriber 400 to a VoLTE session. Hereby, the VoLTE session invitation and the MSISDN of the desired terminating subscriber 400 is first sent to a SBC 310 that forwards the invitation to the S-CSCF 120 of the IMS infrastructure 100 (via the P-CSCF). Here, the S-CSCF 120 deter-mines the location (which IMS) of subscriber 400. It sends the MSISDN to the ENUM server 140 of IMS infrastructure 100 which then provides the corresponding SIP URI. The domain of the SIP URI identifies the destination IMS and the S-CSCF 120 of IMS infrastructure 100 and forwards the session invitation to the I-CSCF 115 of IMS infrastructure 100 (here subscriber 200 and 400 are registered in the same IMS infrastructure). Hereunto, the I-CSCF 115 contacts the HSS 130 that returns the correct S-CSCF 120 (here again same as for both subscribers) and the I-CSCF 115 forwards the session invitation to this S-CSCF 120. Thereupon, the selected S-CSCF 120 contacts the corresponding AS 150 for the requested IMS session and after services execution forwards the invitation to subscriber 400 via the SBC 320. If, however, subscriber 400 is a RCS-message-only subscriber, i.e. the subscriber cannot terminate the session due to a lack of a VoLTE/VoWiFi capability or authorization, the invitation cannot be handled by UE B 400 and the voice session fails as indicated by dotted arrow 500.

This failure cannot be handled by common IMS infrastructures (without specific functions as per this invention), because there is no proper determination of IMS service capabilities/authorizations associated with a UE and corresponding handling of VoLTE/VoWiFi sessions. Each subscriber for any IMS service is listed in the HSS with his MSISDN. The ENUM maps only one single type of SIP URI to the MSISDN no matter what capability/authorization is actually associated with the respective MSISDN.

Figure 1B:
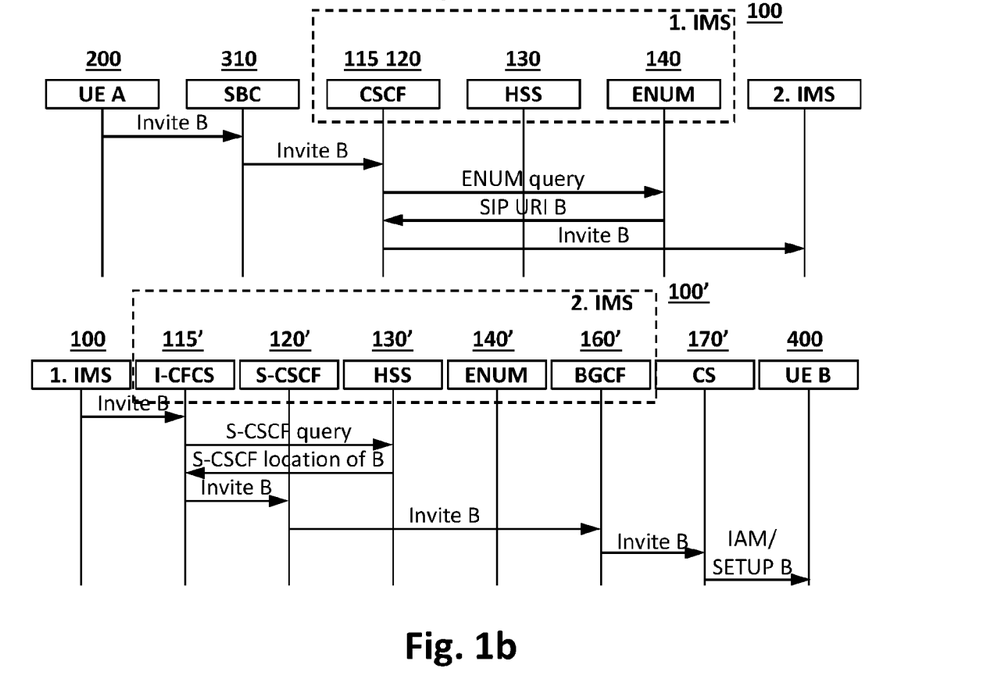
FIG. 1b: Flow chart of an IMS session (VoLTE/VoWiFi, RCS, etc.) invitation from subscriber A registered in a first common IMS infrastructure to an IMS user (e.g. RCS-message-only user) registered in a second common IMS infrastructure.

FIG. 1b depicts an advantageous and desired behavior where a VoLTE/VoWiFi session invitation from the VoLTE subscriber 200 to the RCS-message-only subscriber 400 is rerouted over a CS network 170'. Both users 200/400 are registered. The upper flow shows the IMS originating leg in IMS infrastructure 100 and the lower flow shows the IMS terminating leg in another IMS infrastructure 100' (for this specific example). Subscriber 200 with UE A sends an invitation message for a VoLTE/VoWiFi session to subscriber 400 with UE B being a RCS-message-only device without proper capabilities/authorization for said session. As described above, the invitation request is passed to the SBC 310 and the P- and S-CSCF 110/120. The S-CSCF 120 sends a query to the ENUM server 140. The ENUM 140 sends the SIP URI (SIP URI B) of subscriber 400 back to the S-CSCF 120. In this way the correct SIP URI for subscriber 400 is retrieved by means of the MSISDN of subscriber 400. According to the SIP URI B and information about the target IMS 100' (SIP URI domain) the S-CSCF 120 forwards the request to the I-CSCF 115' of the remote second IMS infrastructure 100' (however, could be the same as of UE A). The I-CFCS 115' sends a query to a HSS 130' that returns the correct S-CSCF 120' for handling the invitation request to the I-CSCF 115'. Based on this information the I-CSCF 115' forwards the VoLTE/VoWiFi session invitation to the S-CSCF 120' that in turn forwards the invitation (based on the proposed and subsequently described embodiments as per this invention) to BGCF 160' (not listed in FIG. 1b) for a CS connection 170 to UE B 400. The de-scribed behavior is called a CS breakout for a VoLTE/VoWiFi invitation for RCS-message-only subscriber.

For the described termination issue to occur it doesn't matter if subscriber 200 with VoLTE/VoWiFi capabilities and authorizations is registered in the same IMS infrastructure 100 as RCS-message-only subscriber 400 without VoLTE/VoWiFi capabilities and authorizations or in another IMS infrastructure 100/100'. Hence, the subsequently de-scribed embodiments of the present invention may be applied for subscribers in on single IMS infrastructure as well as for subscribers in (many) different IMS infrastructures. Therefore, the present invention is not limited to either case.

The above described CS breakout can be achieved in different ways. The different embodiments of the present invention as set forth here-after enable a common IMS infrastructure 100/100' to handle a VoLTE/VoWiFi invitation for a RCS-message-only subscriber.

All further described embodiments are based on a common IMS infrastructure 100/100' as described above. For easier understanding only the parts and members relevant for the respective embodiment are depicted and described. All parts and members of the respective IMS infrastructure 100 of an embodiment that are not shown or described shall be considered as being unchanged.

Figure 2:
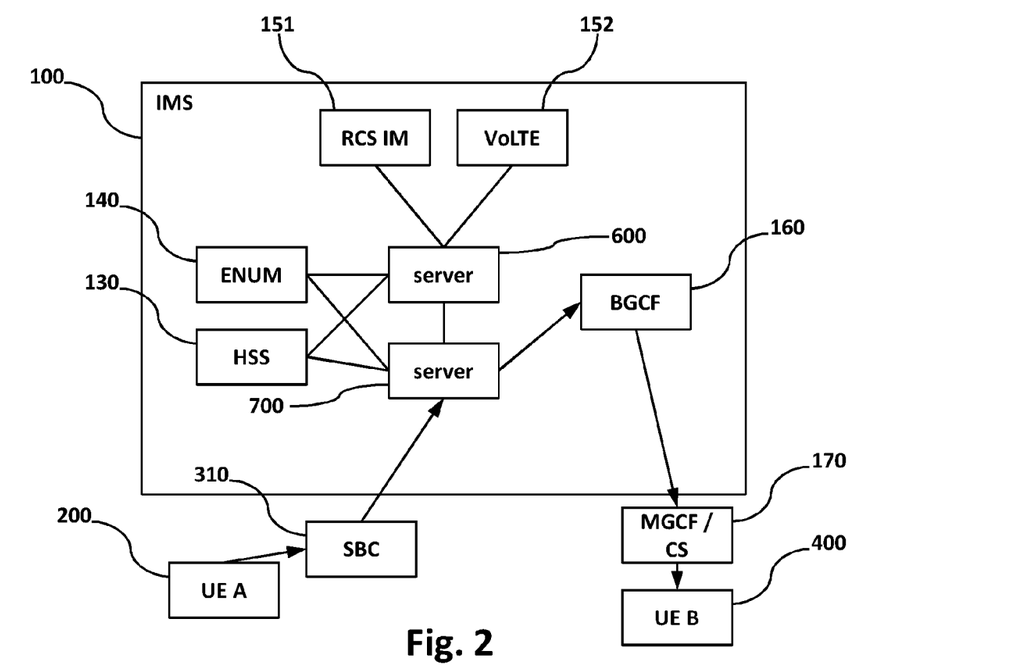
FIG. 2: Schematic overview of an IMS infrastructure according to the present invention.

FIG. 2 depicts an adapted IMS infrastructure 100 according to the present invention. At least an RCS-message-only AS e.g. for IM (RCS IM) 151 and a VoLTE/VoWiFi AS 152 are comprised by the IMS infrastructure 100. A server 600 may be provided, which server 600 is suitable for determining the IMS service session capabilities and/or authorizations of the subscribers 200/400. At least the RCS-messaging-only and VoLTE or VoWiFi capabilities and/or authorizations can be determined by the server 600. Further, the IMS infrastructure 100 may comprise a server 700 that can trigger a CS breakout via the BGCF 160. The servers 600/700 may use information and services from the HSS 130 and the ENUM 140 to realize the IMS service capability and/or authorization determination. A VoLTE/VoWiFi invitation from the subscriber 200 over SBC 310 to the RCS-message-only subscriber 400 is hence rerouted for a CS network 170 based on the additional information about the capabilities/authorizations of subscriber 400 (in case UE B cannot handle the VoLTE/VoWiFi session).

Figure 3:
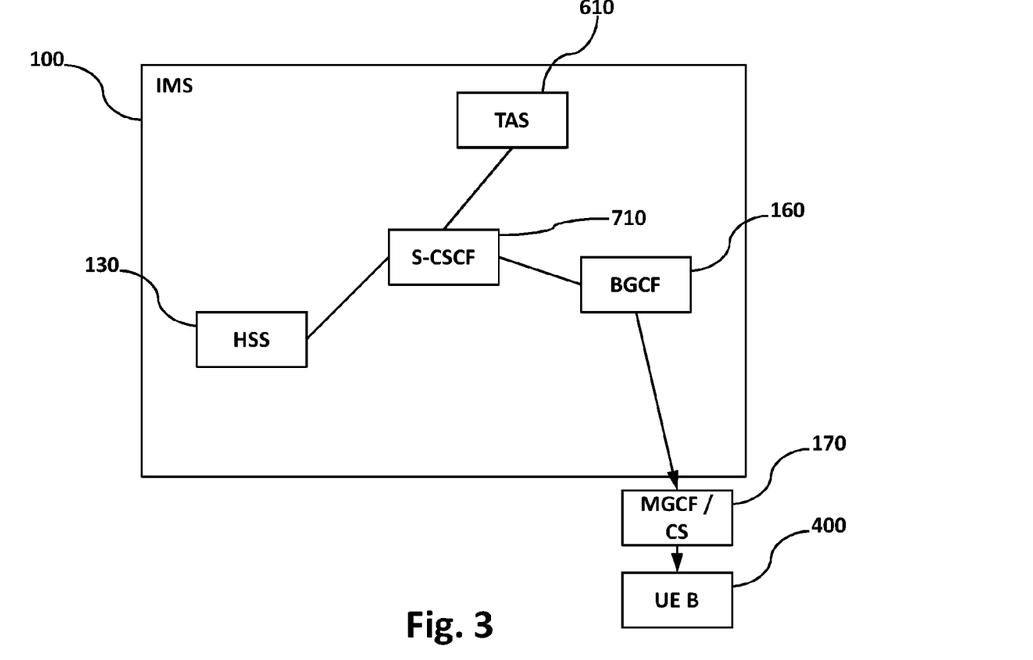
FIG. 3: Schematic overview of specific relevant parts of an IMS infrastructure according to a 1st refined embodiment of the present invention.

FIG. 3 depicts an adapted IMS infrastructure 100 according to a first refined embodiment of the present invention. A TAS 610 is configured to determine the IMS capabilities and/or authorizations or at least the RCS-message-only and VoLTE/VoWiFi capabilities/authorizations of subscribers 200/400 based on a specific iFC. For RCS-messaging-only users 400 there is a terminating iFC (normally not set) which first does 3rd party registration in the TAS 610 and also forwards VoLTE/VoWiFi sessions to the TAS 610 as per se iFC set in the HSS 130. The TAS 610 can then determine the user capabilities from a Contact Header received during the 3rd party registration, here RCS-messaging-only. Based on the IMS capabilities/authorizations (in case the user is not capable or authorized for VoLTE/VoWiFi) the TAS 610 adds a prefix to the MSISDN of terminating subscriber 400. Therefore, RCS-message-only subscriber 400 can be distinguished as being unable to handle a VoLTE/VoWiFi invitation and such voice session invitation can be rerouted by a S-CSCF 710 via BGCF 160 resulting in a CS breakout to the CS network 170.

Figure 4:
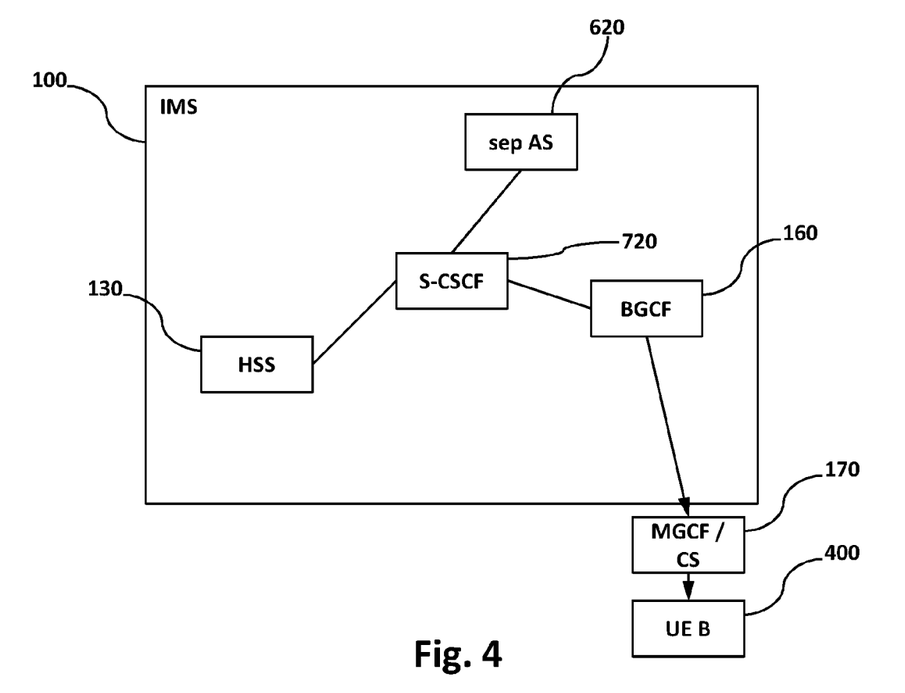
FIG. 4: Schematic overview of specific relevant parts of an IMS infrastructure according to a 2nd refined embodiment of the present invention.

FIG. 4 depicts an adapted IMS infrastructure 100 according to a second refined embodiment of the present invention. A separate AS 620 exclusively for VoLTE or VoWiFi sessions for RCS-message-only subscribers is deployed. The IMS service session capabilities and/or authorizations for each user are determined via a specific iFC. For RCS-messaging-only users there is a terminating iFC (normally not set) which does 3rd party registration in the separate AS 620 and also forwards VoLTE/VoWiFi sessions to this separate AS 620 as per se iFC set in the HSS 130. The AS can then determine the user's capabilities from the Contact Header received during the 3rd party registration, here RCS-messaging-only. In contrast to the TAS 610 based solution the separate AS 620 does not need to check the capabilities received in the registration process, because VoLTE/VoWiFi sessions for VoLTE/VoWiFi capable or authorized users do not reach this separate AS 620. The separate AS 620 adds a distinct prefix to each MSISDN according to the available IMS capabilities/authorizations of the terminating subscriber 400. A VoLTE/VoWiFi invitation to RCS-only-subscriber 400 can thusly be rerouted by a S-CSCF 720 via BGCF 160 resulting in a CS breakout to the CS network 170.

Figure 5:
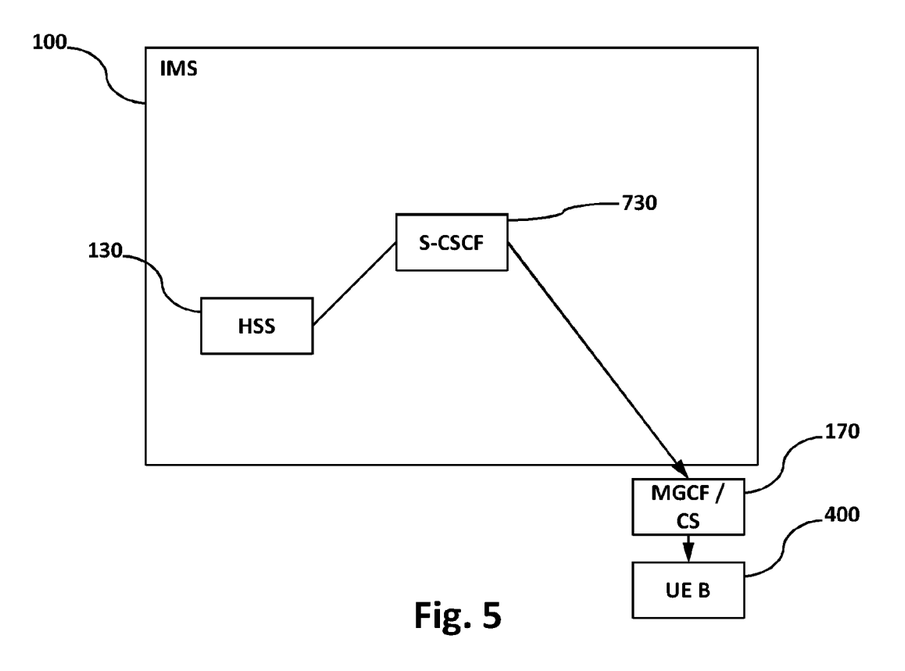
FIG. 5: Schematic overview of specific relevant parts of an IMS infrastructure according to a 3rd refined embodiment of the present invention.

FIG. 5 depicts an adapted IMS infrastructure 100 according to a third refined embodiment of the present invention. An extended S-CSCF 730 is implemented that uses iFC (only set for RCS-messing-only users) to trigger rerouting of a IMS VoLTE/WiFi session invitation to MGFC 170 as AS. The CS breakout is based on the information about IMS service capabilities and/or authorizations for the terminating subscriber 400, which information is stored in the HSS 130 and used by the iFC.

Figure 6:
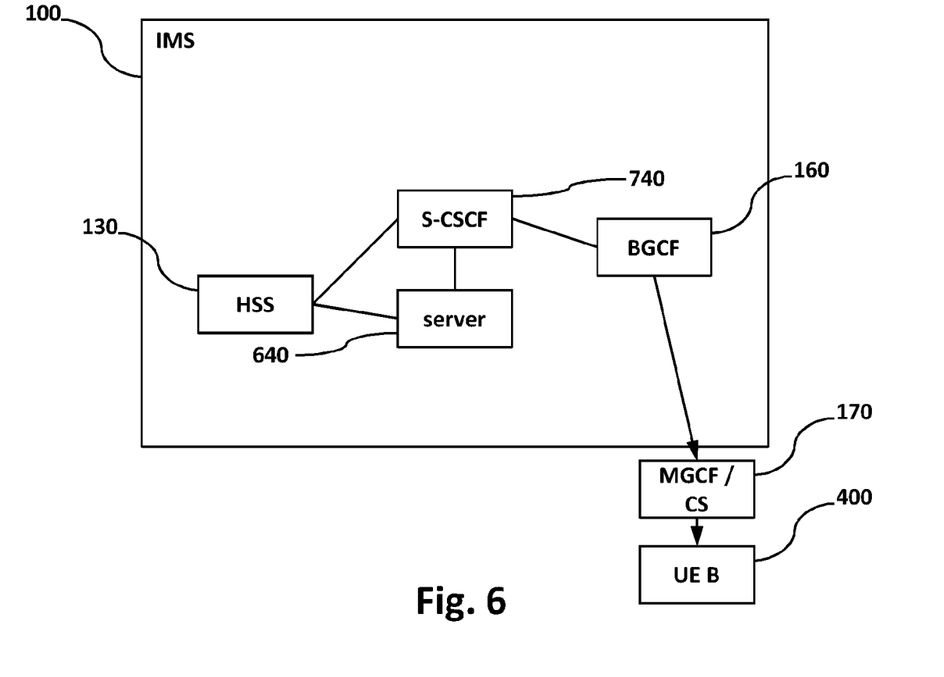
FIG. 6: Schematic overview of specific relevant parts of an IMS infrastructure according to a 4th refined embodiment of the present invention.

FIG. 6 depicts an adapted IMS infrastructure 100 according to a fourth refined embodiment of the present invention. A server 640 uses an enhanced functionality based on Caller Preferences Functionality (CPF) defined in RFC 3841 for excluding a subscriber 400 from a list of possible destinations for a certain IMS service invitation. The CPF can check the capabilities received during registration and the session parameters received in the Accept-Contact or Reject-Contact header. Based on this it can select the proper SIP client registered to IMS. Because Accept-Contact and Reject-Contact header may not be present in the voice session invitation, e.g. voice originated from a device that does not populate those headers, and CS break out may not be mentioned as termination option, the idea of this embodiment is to use the information received during the SIP registration and to detect the session type based on e.g. media type in SDP and to trigger CS breakout in case RCS-messaging-only client and media type voice. The exclusion is based on determined IMS capabilities/authorizations of the subscriber 400 retrieved from Contact Header received from the UE in the registration process. During the SIP registration process the SIP client provides information to the IMS about its capabilities in the Contact Header, e.g. RCS-messaging-only. When a VoLTE/VoWiFi session destined for such a user arrives at the S-CSCF (e.g. detected based on media type in SDP (Session Description Protocol) the S-CSCF can exclude the RCS-messaging-only client. Further, a server 740 using a S-CSCF can reroute an IMS session invitation to BGCF 160 if the terminating subscriber 400 is excluded from the list of valid destinations as described above (list-empty condition). Hence, a CS breakout for a VoLTE/VoWiFi invitation to a RCS-message-only user 400 can be rerouted via SBC 320 and CS network 170.

Figure 7:
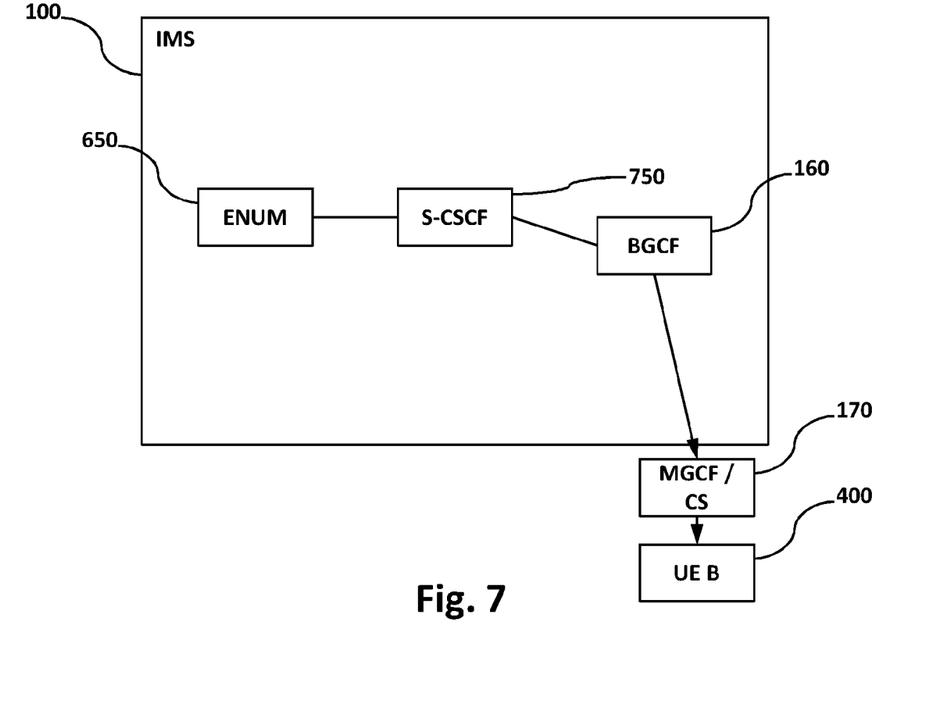
FIG. 7: Schematic overview of specific relevant parts of an IMS infrastructure according to a 5th refined embodiment of the present invention.

FIG. 7 depicts an adapted IMS infrastructure 100 according to a fifth refined embodiment of the present invention. Here, an extended ENUM server 650 is provisioned with a SIP URI having a distinct domain for a subscriber 200/400 based on the determined capabilities and authorizations of said subscriber 200/400, e.g. <MSISDN>@msg.ims.company.com for RCS-messaging-only users 400 and <MSISDN>@voice.ims.company.com for VoLTE/VoWiFi users 200. A server using S-CSCF 750 checks service (VoLTE/VoWiFi, e.g. based on media type) and the SIP URI (<MSISDN>@msg.ims.company.com) and triggers rerouting of a VoLTE or VoWiFi session invitation to a CS network 170 based on the assigned SIP URI.

Figure 8:
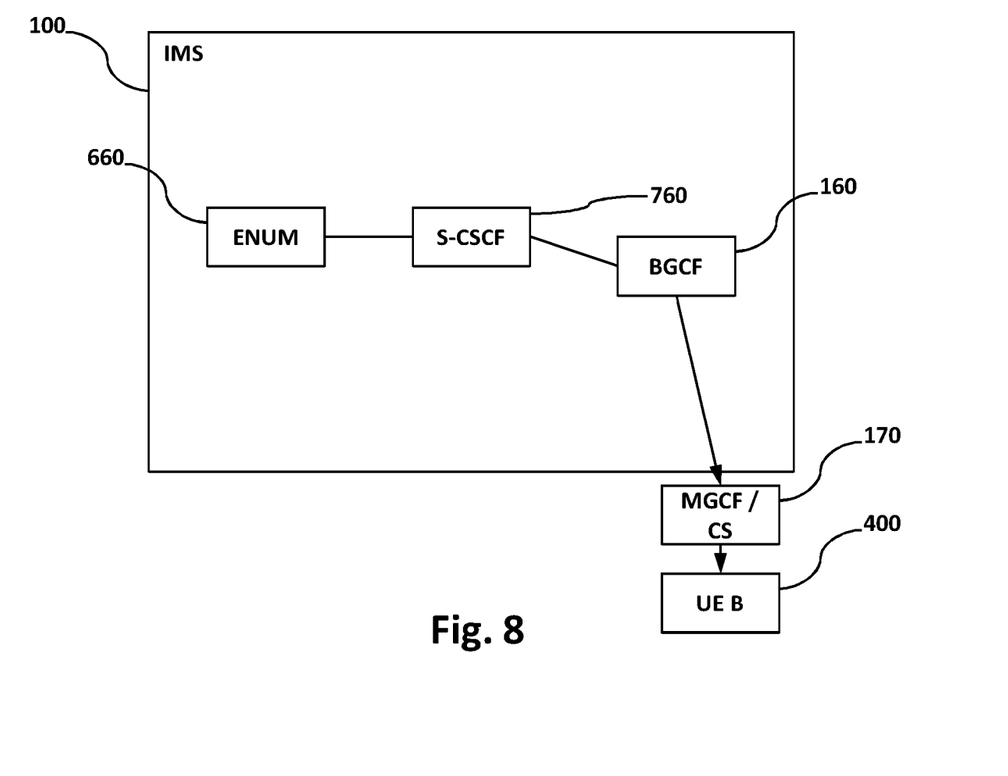
FIG. 8: Schematic overview of specific relevant parts of an IMS infrastructure according to a 6th refined embodiment of the present invention.

FIG. 8 depicts an adapted IMS infrastructure 100 according to a sixth refined embodiment of the present invention. This embodiment is based on different ENUM subtypes for SIP which are not specified in common IMS: –"E2U+SIP:voice" <MSISDN>@voice.ims.company.com for VoLTE/VoWiFi service and "E2U+SIP.msg" <MSISDN>@msgAms.company.com for RCS-messaging-only service. These are provisioned for a given MSISDN and returned to a S-CSCF 760. Therefore, an extended ENUM server 660 is deployed that stores several SIP URIs with distinct domains depending on the respective IMS service capabilities and/or authorizations for each subscriber 200/400 see above) based on different ENUM subtypes for SIP. A server that uses the S-CSCF 760 checks the service type (VoLTE/VoWiFi, e.g. based on media type), selects the corresponding SIP URI (here <MSISDN>@voice.ims.company.com) and triggers rerouting of a VoLTE or VoWiFi session invitation to a CS network 170 based on this SIP URI. Therefore, a VoLTE/VoWiFi invitation for a RCS-message-only subscriber 400 is rerouted via BGCF 160 to the CS network 170 and successful terminated at RCS-message-only UE B 400.

What is claimed is:

1. Internet Protocol (IP) Multimedia Subsystem (IMS) infrastructure hosting at least two different IMS services, wherein at least one of the at least two different IMS services is based on Rich Communications Suite (RCS) for messaging only, wherein at least another one of the at least two different IMS services is based on Voice over Long Term Evolution (VoLTE) or Voice over Wireless Fidelity (VoWiFi), the IMS infrastructure comprising:
    a server for determining at least RCS-messaging-only service session capabilities and authorizations and VoLTE or VoWiFi service session capabilities and authorizations of a subscriber; and
    a server for rerouting a VoLTE or VoWiFi session invitation for said subscriber to a Breakout Gateway (BG) using a Breakout Gateway Control Function (BGCF) for forwarding said VoLTE or VoWiFi session invitation to said subscriber via a Media Gateway Control Function (MGCF) and a Circuit Switched (CS) network based on the determined capabilities and authorizations of said subscriber.

2. The IMS infrastructure according to claim 1, further comprising:
    a Telecommunication Application Server (TAS) for determining the service session capabilities and authorizations of a subscriber via at least one initial Filter Criterion (iFC) wherein the TAS adds a prefix to a Mobile Subscriber Integrated Services Digital Network Number (MSISDN) of the subscriber; and
    a server using a Service-Call Session Control Function (S-CSCF) that triggers the rerouting of a VoLTE or VoWiFi session invitation for said subscriber based on the MSISDN with prefix.

3. The IMS infrastructure according to claim 1, further comprising:
    a separate Application Server (AS) for receiving a VoLTE and/or VoWiFi session invitation for a subscriber based on the service session capabilities and authorizations of said subscriber determined via at least one iFC, wherein the separate AS adds a prefix to a MSISDN of the subscriber; and
    a server using a S-CSCF triggering the rerouting of said VoLTE or VoWiFi session invitation for said subscriber via the MSISDN with prefix.

4. The IMS infrastructure according to claim 1, further comprising:
   a server using a S-CSCF using at least one iFC to trigger usage of a MGCF as an AS for a VoLTE or VoWiFi session invitation for a subscriber based on the determined service session capabilities and authorizations of said subscriber, which MGCF forwards said VoLTE or VoWiFi session invitation to said subscriber via a CS network.

5. The IMS infrastructure according to claim 1, further comprising:
   a server using a S-CSCF using a Caller Preferences Functionality (CPF) according to RFC 3841, which S-CSCF excludes a subscriber from a list of possible destinations for VoLTE and/or VoWiFi session invitations based on the determined service session capabilities and authorizations of said subscriber, wherein a VoLTE or VoWiFi session invitation for said subscriber triggers forwarding of said session to a BGCF based on the determined service session capabilities and authorizations of said subscriber, which BGCF forwards said VoLTE or VoWiFi session invitation to said subscriber via a CS network.

6. The IMS infrastructure according to claim 1, further comprising:
   an E.164 Number Mapping (ENUM) server storing Session Initiation Protocol (SIP) Uniform Resource Identifiers (URI) that enables determining the service session capabilities and authorizations of a subscriber, wherein the ENUM server (650) is provided with a SIP URI with a distinct domain for said subscriber based on the determined capabilities and authorizations of said subscriber; and
   a server using a S-CSCF checking the SIP URI and triggering rerouting of a VoLTE or VoWiFi session invitation to a CS network based on the provided SIP URI domain.

7. The IMS infrastructure according to claim 1, further comprising:
   an ENUM server storing SIP URIs that enable determining the service session capabilities and authorizations of a subscriber, wherein the ENUM server assigns one SIP URI with a distinct SIP URI domain to said subscriber for each IMS service based on the determined capabilities and authorizations of said subscriber; and
   a server using a S-CSCF checking a service type of a VoLTE or VoWiFi session invitation, selecting the corresponding SIP URI for said VoLTE or VoWiFi session invitation and triggering the rerouting of said VoLTE or VoWiFi session invitation to a CS network based on the assigned SIP URI domain.

8. A method for rerouting a Voice over Long Term Evolution, VoLTE, or Voice over Wireless Fidelity (VoWiFi) session invitation in an Internet Protocol (IP) Multimedia Subsystem (IMS) infrastructure hosting at least two different IMS services, wherein at least one of the at least two different IMS services is based on Rich Communications Suite (RCS) for messaging only and wherein at least another one of the at least two different IMS services is based on Voice over Long Term Evolution (VoLTE) or Voice over Wireless Fidelity (VoWiFi), the method comprising:
   determining at least a RCS-messaging-only service and a VoLTE or VoWiFi service session capabilities and authorizations of a subscriber by a server comprised in the IMS infrastructure, and
   rerouting a VoLTE or VoWiFi session invitation for the subscriber by a server comprised in the IMS infrastructure for rerouting a VoLTE or VoWiFi session invitation for the subscriber to a Breakout Gateway (BG) comprised in the IMS infrastructure using a Breakout Gateway Control Function (BGCF) for forwarding said VoLTE or VoWiFi session invitation to said subscriber via a Media Gateway Control Function (MGCF) and a Circuit Switched network (CS) network based on the determined capabilities and authorizations of said subscriber.

9. The method for rerouting a VoLTE or VoWiFi session invitation according to claim 8, further comprising:
   determining at least RCS-messaging-only service session capabilities and authorizations and VoLTE or VoWiFi service session capabilities and authorizations of a subscriber via at least one initial Filter Criterion (iFC) in a Telephony Application Server (TAS) comprised in the IMS infrastructure and adding a prefix to a Mobile Subscriber Integrated Services Digital Network Number (MSISDN) of the subscriber; and
   triggering the rerouting of a VoLTE or VoWiFi session invitation for said subscriber in a server using a Service-call Session Control Function (S-CSCF) comprised in the IMS infrastructure based on the MSISDN with prefix.

10. The method for rerouting a VoLTE or VoWiFi session invitation according to claim 8, further comprising:
    receiving a VoLTE and/or VoWiFi session invitation for a subscriber in a separate application Server (AS) comprised in the IMS infrastructure based on the service session capabilities and authorizations of said subscriber determined via at least one iFC;
    adding a prefix to a MSISDN of the subscriber by said separate AS; and
    triggering the rerouting of said VoLTE or VoWiFi session invitation for said subscriber in a server using a S-CSCF comprised in the IMS infrastructure based on the MSISDN with prefix.

11. The method for rerouting a VoLTE or VoWiFi session invitation according to claim 8, further comprising:
    using at least one iFC by a server using a S-CSCF comprised in the IMS infrastructure to trigger usage of a MGCF as an AS for a VoLTE or VoWiFi session invitation for a subscriber based on the determined service session capabilities and authorizations of said subscriber, and forwarding said VoLTE or VoWiFi session invitation by the MGCF to said subscriber via a CS network.

12. The method for rerouting a VoLTE or VoWiFi session invitation according to claim 8, further comprising:
    using a Caller Preferences Functionality (CPF) according to RFC 3841 in a server using a S-CSCF comprised in the IMS infrastructure to exclude a subscriber from a list of possible destinations for VoLTE or VoWiFi session invitations based on the determined service session capabilities and authorizations of said subscriber, wherein a VoLTE or VoWiFi session invitation for said subscriber triggers forwarding of said session to a BGCF based on the determined service session capabilities and authorizations of said subscriber; and
    forwarding said VoLTE or VoWiFi session invitation to said subscriber by a BGCF via a CS network.

13. The method for rerouting a VoLTE or VoWiFi session invitation according to claim 8, further comprising:
    determining the service session capabilities and authorizations of a subscriber by an SIP URI enabled ENUM server comprised in the IMS infrastructure, wherein a SIP URI with a distinct domain is provided for said subscriber based on the determined capabilities and authorizations of said subscriber; and checking the SIP URI and triggering rerouting of a VoLTE or VoWiFi session invitation to a CS network by a server using a S-CSCF comprised in the IMS infrastructure based on the provided SIP URI domain.

14. The method for rerouting a VoLTE or VoWiFi session invitation according to claim 8, further comprising:

determining the service session capabilities and authorizations of a subscriber in an ENUM server comprised in the IMS infrastructure based on SIP URIs, wherein one SIP URI with a distinct SIP URI domain for each IMS service is assigned to said subscriber based on the determined service session capabilities and authorizations of said subscriber;

checking the service, selecting the corresponding SIP URI for a VoLTE or VoWiFi session invitation; and triggering the rerouting of the VoLTE or VoWiFi session invitation to a CS network by a server using S-CSCF comprised in the IMS infrastructure based on the assigned SIP URI domain.

* * * * *